United States Patent Office 3,629,322
Patented Dec. 21, 1971

3,629,322
ORGANIC ESTERS AND THEIR USE AS ULTRAVIOLET LIGHT ABSORBERS AND AS HEAT STABILIZERS
Stanley J. Buckman, Kenneth J. Flanagan, John D. Pera, and Lester A. Wienert, Memphis, Tenn., assignors to Buckman Laboratories, Inc., Memphis, Tenn.
No Drawing. Filed Feb. 17, 1969, Ser. No. 800,007
Int. Cl. C07c *69/78;* C08f *45/58*
U.S. Cl. 260—476 C    3 Claims

ABSTRACT OF THE DISCLOSURE

Betabenzoyloxy-2'-hydroxychalcones which are useful as ultraviolet light absorbers and heat stabilizers are produced by slowly adding benzoyl chloride to a solution comprising an alkali-metal hydroxide, a 1-(o-hydroxyphenyl)-3-phenyl-1,3-propanedione or a halo substituted compound thereof, and dimethylformamide at a temperature varying from room to about 30° C. Upon completion of the reaction, the mixture is poured into ice water to obtain the chalcone as a colorless solid.

---

This invention relates to the stabilization of organic compositions against the deteriorating effects of ultraviolet light and heat. More particularly, the present invention relates to the stabilization of polymeric and organic coating compositions against ultraviolet light and heat by incorporating in such compositions an ester which may be defined as a betabenzoyloxy-2'-hydroxychalcone.

It is well known that many organic compositions such as polymeric organic materials and organic coating compositions tend to undergo deterioration when exposed to ultraviolet light and/or heat. Light in the ultraviolet portion of the spectrum and particularly that having a wavelength within 290–400 millimicrons causes photocatalyzed changes, such as yellowing and/or embrittlement of unstabilized polymeric and organic coating compositions. These changes are obviously undesirable and this is particularly true when the composition is initially colorless, transparent, or translucent and is to be used subsequently under conditions that will subject it to long exposure to sunlight or other sources of ultraviolet light radiation. Examples of such applications include translucent roofing materials, transparent structures, decorative structures, decorative and protective coatings, and impact-resistant windows.

Exposure to heat causes embrittlement, discoloration, reduction of optical clarity, and general deterioration in the physical properties of the composition. A large number of compounds including metallic salts of inorganic and organic acids, alkylated phenols and diphenols, aromatic amines, organic phosphites, and beta,beta'-thiopropionic acid esters have been used as heat stabilizers.

In recent years, many organic compounds have become available which can absorb ultraviolet light and convert it to less harmful forms of energy such as heat, vibrational energy, or less harmful radiation. These organic stabilizers, in addition to absorbing ultraviolet radiation in the selected range for the polymeric or organic coating compositions being treated, must be compatible therewith, have little or no initial color, be reasonably inexpensive, be chemically stable, and have a low toxicity, especially for stabilizing compositions to be used subsequently in the food industry.

A good ultraviolet absorber for use in polymeric and coating compositions should absorb the ultraviolet radiation in daylight and at the same time be a colorless material by visual observation. The compound should impart no color to the composition, should be sufficiently stable to withstand curing conditions, and should absorb ultraviolet light sufficiently to protect the composition against yellowing and decomposition on exposure to ultraviolet light. The compound must have sufficient solubility in various types of materials so that it may be incorporated easily into various compositions, and once incorporated therein, it should be capable of withstanding leaching action of solvents or loss by exudation.

Generally, an effective ultraviolet absorber should have its peak absorption above a wavelength of 300 millimicrons or the absorption peak may be at a higher wavelength as long as the absorption drops off sufficiently as it approaches the visual range so that no color is visible. In addition, to be effective it should show a high degree of absorbancy in the desired wavelength range, especially at those wavelengths sufficiently below the visual range so that the compound has no yellow color visually.

Although, as pointed out above, many compounds have been suggested for the stabilization of polymeric and organic coating compositions against deterioration caused by ultraviolet light, none have been entirely satisfactory as all have been deficient in one or more qualities which the ideal ultraviolet absorber must possess. These include, in addition to lack of color, the ability to become firmly incorporated in the composition to be stabilized and the ability to absorb ultraviolet light over a wide range. The latter is important because individual organic compositions are generally most susceptible to deterioration by radiation of a specific wavelength. For example, polyethylene and polystyrene are susceptible to radiation wavelengths of 300–320 millimicrons, while polypropylene is most sensitive to radiation wavelengths of 370 millimicrons. Many of the absorbers disclosed in the prior art exhibit excellent ultraviolet light absorption only over a very limited wavelength.

Heretofore when it was necessary to protect polymeric and organic compounds against deterioration caused by ultraviolet light and heat, the use of two stabilizers has been mandatory, one to protect the compound against ultraviolet light and the other to provide protection from heat. This is objectionable because when two stabilizers are used, each stabilizer must not only perform its particulas function effectively but, in addition, the two stabilizers must be compatible. Obviously, a single compound effective both as an ultraviolet light absorber and as a heat stabilizer would eliminate completely the compatibility requirement and for that reason be very desirable.

It is, therefore, a princpal object of the present invention to provide a stabilizer for polymeric and organic compositions which is effective as an ultraviolet light absorber and as a heat stabilizer.

It is another object of our invention to provide a composition which is resistant to degradation by heat and ultraviolet light radiation and heat.

These and other objects and advantages will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by incorporating into the polymeric compositions and organic compositions susceptible to deterioration by the action of ultraviolet light radiation and heat the new and novel compounds of our invention which may be broadly defined as organic esters. These compounds may be prepared by reacting benzoyl chloride with an alkalimetal salt of 1-(o-hydroxyphenyl)-3-phenyl-1,3-propanedione in a dimethylformamide solution.

These esters we discovered, much to our surprise, are colorless. This discovery is indeed surprising when it is noted that the precursors of these compounds are intensely colored a bright and deep yellow. In addition, we have found that these esters are not subject to deterioration when exposed to ultraviolet light or heat. Furthermore, these compounds exhibit outstanding ultraviolet light absorbing properties over a wide range of wavelengths.

Somewhat more specifically, these compounds may be defined as an ester having the formula

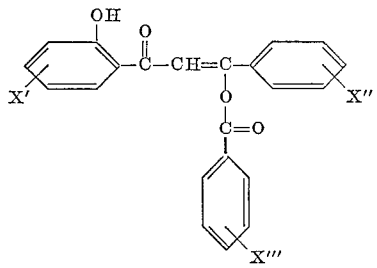

wherein X', X'', and X''' are independently H, Cl, or Br.

We have found that polymeric and organic coating compositions of increased stability particularly in respect to exposure to ultraviolet light and heat can be obtained by incorporating in such compositions as ester as hereinbefore described an amount varying from about 0.1 percent to about 5 percent or more by weight based on the total weight of the polymeric or coating composition.

Polymeric and organic coating compositions which can be protected from the degrading effects of ultraviolet light and heat by the use of our esters include alkyd resins as disclosed in U.S. Pats. 1,847,783, 1,860,164, 1,950,468, and 2,087,852; epoxy resins as disclosed in U.S. Pat. 2,886,473; polyester resins; polyurethane; polyethylene; polypropylene; polystyrene; polyvinyl chloride resins; cellulosic and acrylic polymers; linear super polyamide obtained by condensing an aliphatic polyethylenediamine with a dicarboxylic acid; industrial coatings including decorative and protective coatings wherein one or more of the components thereof comprises an organic composition susceptible to deterioration when exposed to ultraviolet light or heat; coated fabrics such as fabrics coated with polyvinyl chloride and polyolefin; and polyvinylidene chloride monofilaments.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Betabenzoyloxy-2'-hydroxychalcone 1-(o-hydroxyphenyl)-3-phenyl-1,3-propanedione was prepared using the procedure described in "Organic Syntheses," Collective volume IV, pages 478–481, John Wiley and Sons, Inc., New York, 1963.

A 500-milliliter reaction flask was charged with 24.1 grams (0.1 mole) of 1-(o-hydroxyphenyl)-3-phenyl-1,3-propanedione, 6.6 grams of 85 percent potassium hydroxide (0.1 mole), and 120 milliliters of dimethylformamide. Benzoyl chloride (15.5 grams, 0.11 mole) was added dropwise over a 20 minute period at 25–30° C. The reaction mixture gradually changed from an orange to a yellow color and some solid precipitated. After stirring the mixture an additional 1.5 hours, the reaction mixture was poured into 700 milliliters of ice water. A yellow, viscous liquid which gradually solidified was obtained in the mixture. The solid was collected on a Buchner filter, washed with water, and air dried. The product was pale amber, but after one recrystallization from isopropyl alcohol, 17.4 grams (50 percent) of white, crystalline betabenzoyloxy-2'-hydroxychalcone was obtained (M.P. 108–110° C.).

Calculated for $C_{22}H_{16}O_4$ (percent): C 76.7; H, 4.7. Found (percent): C, 76.8; H, 4.8.

The ultraviolet absorption spectrum in toluene had an intense maximum at 345 millimicrons and excellent absorbance in the range of 290–375 millimicrons. The compound gave a positive phenol test with ferric chloride solution and had infrared maxima at 1730, 1250–1270, and 1195 cm.$^{-1}$ indicative of a benzoate ester and a free phenolic hydroxyl.

EXAMPLE 2

Betabenzoyloxy-5'-bromo-2'-hydroxychalcone 1-(5-bromo-2-hydroxyphenyl) - 3 - phenyl-1,3-propanedione was prepared starting with 5'-bromo-2'-hydroxyacetophenone using a procedure similar to that described in "Organic Syntheses," Collective volume IV, pages 478–481, John Wiley and Sons, Inc., New York, 1963.

The same procedure as that used in Example 1 was used to react 18.0 grams (0.056 mole) of 1-(5-bromo-2-hydroxyphenyl)-3-phenyl-1,3-propanedione with 3.5 grams of 85 percent potassium hydroxide and 9.9 grams (0.071 mole) of benzoyl chloride in 100 milliliters of dimethylformamide. The crude yellow product obtained when the reaction was added to ice water was filtered and recrystallized from isopropanol to yield 12.2 grams (52 percent) of white, crystalline betabenzoyloxy-5'-bromo-2'-hydroxychalcone, M.P. 128–129° C. The ultraviolet absorption spectrum in toluene showed an intense maximum at 346 millimicrons and excellent absorbent at 290–377 millimicrons. This compound also gave a positive phenol test with ferric chloride solution and the infrared spectrum had maxima of 1740, 1255, and 1198 cm.$^{-1}$ which are indicative of a benzoate ester and a free phenolic hydroxyl.

EXAMPLE 3

In this example, betabenzoyloxy - 2' - hydroxychalcone was added to each of three different coating compositions of 50 percent solids identified as follows: medium soya alkyd resin, air-dried polyurethane resin, and a tung oil varnish at concentrations of 0, 0.5, and 1.0 percent by weight based on the total weight of the clear coating. These coatings were applied by brush to maple and Douglas fir wood surfaces. Two coats were applied, allowing 24 hours between coats for drying. After the second coat had dried 24 hours, a small area of each coating on each of the wood surfaces was protected with a black tape and exposed to ultraviolet light in a UV chamber.

After 50 hours exposure, the coatings that did not contain the ester were badly discolored. Those coatings that contained 0.5 percent of the ester were only slightly colored and the coatings containing 1.0 percent of the ester exhibited no discoloration.

EXAMPLE 4

Similar results were obtained when betabenzoxloxy-5'-bromo-2'-hydroxychalcone was substituted for the ester used in Example 3.

EXAMPLE 5

In this example, two resinous compositions were prepared, one of which contained on a weight basis 100 parts polyvinyl chloride resin, 20 parts dioctyl phthalate, and 1 part barium stearate and the other of which also on a weight basis contained 100 parts of polyvinyl chloride resin, 50 parts dioctyl phthalate, and 1 part barium stearate. Each of these two resinous compositions was divided into five equal portions. To each of the resulting portions was then added betabenzoyloxy-2'-hydroxychalcone in such an amount that the weight percent of the ester based on the weight of the polyvinyl chloride varied as follows: 0, 0.25, 0.5, 1.0, and 2.0.

All of the ingredients were dry blended and converted into a plastic mass by fusing in a beater blender (Plasti-Corder) at 150° C. for 5 minutes. The resulting mass was pressed into sheets having a thickness of 0.025 inch in a Carver Press at 150° C. The sheets which did not contain the ester were discolored a dark yellow. Those containing the ester exhibited less discoloration, varying from a pale yellow for those containing less than 1.0 percent of the ester to a slight or no discoloration for those containing 1.0 percent or more of the ester. Additional heating of these sheets in an oven at 150° C. and 200° C. for periods varying from 15 to 60 minutes caused the sheets that did not contain the ester to turn almost black and those containing the ester exhibited little change in color.

EXAMPLE 6

The procedure of Example 5 was followed except betabenzoyloxy-5'-bromo-2'-hydroxychalcone was substituted for the ester used in that example. Similar results were obtained.

We claim:
1. Compounds having the formula:

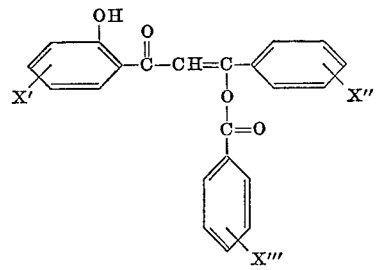

wherein X', X", and X''' are independently H, Cl, or Br.
2. The compound of claim 1 wherein X', X" and X''' are H.
3. The compound of claim 1 wherein X' is Br and X" and X''' are H.

References Cited
UNITED STATES PATENTS

| | | | |
|---|---|---|---|
| 3,175,024 | 3/1965 | Tocker | 260—45.85 |
| 3,240,752 | 3/1966 | Tamblyn | 260—45.95 |
| 2,728,784 | 12/1955 | Bell et al. | 260—592 |

OTHER REFERENCES
Chem. Abstracts, vol. 63, 1965, col. 13007, Hlavka.
Chem. Abstracts, vol. 63, 1965, col. 18043, Tabriker.

LEWIS GOTTS, Primary Examiner

A. L. DAVISON, Assistant Examiner

U.S. Cl. X.R.

106—180; 260—18 R, 45.85